(12) United States Patent
Yoshida et al.

(10) Patent No.: US 6,731,057 B2
(45) Date of Patent: May 4, 2004

(54) PHOSPHORS FOR FLUORESCENT LAMPS

(75) Inventors: Hisashi Yoshida, Tokyo (JP); Maki Minamoto, Tokyo (JP); Kazuya Ito, Tokyo (JP); Yosuke Nishikage, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/105,808

(22) Filed: Mar. 21, 2002

(65) Prior Publication Data

US 2002/0190634 A1 Dec. 19, 2002

(30) Foreign Application Priority Data

Mar. 22, 2001 (JP) .......................... 2001-083384

(51) Int. Cl.[7] .................... H01J 11/02; C09K 11/78
(52) U.S. Cl. ................ 313/486; 252/301.4 H; 252/301.4 R

(58) Field of Search ................ 313/486, 487, 313/485, 483; 252/301.4 R, 301.4 H, 301.6 R

(56) References Cited

FOREIGN PATENT DOCUMENTS

| JP | 5-051581 | 2/1993 |
|---|---|---|
| JP | 09-231944 | 5/1997 |

*Primary Examiner*—Vip Patel
*Assistant Examiner*—Joseph Williams
(74) *Attorney, Agent, or Firm*—Whitham, Curtis & Christofferson, P.C.

(57) ABSTRACT

A phosphor represented by the formula $(1-x)CaO \cdot EU(O) \cdot yMgO \cdot nSiO_2$, wherein x, y and n represent number of moles, respectively, provides increased initial luminous intensity and exhibits superior sustainability of luminous intensity over long periods of use in a fluorescent lamp including the above phosphor.

14 Claims, 1 Drawing Sheet

PHOSPHORS FOR FLUORESCENT LAMPS

BACKGROUND OF THE INVENTION

1. Field of the Invention

The present invention relates to phosphors and fluorescent lamps utilizing phosphors, more particularly, phosphors emitting blue light and fluorescent lamps utilizing blue light emitting phosphors.

2. Description of the Related Art

A mixture of three color phosphors emitting red, green and blue lights is utilized as phosphors for a cold cathode fluorescent lamp of three-wavelength-region emitting type whose excitation source is a mercury luminescent line or for a general fluorescent lamp. It is well known that the blue light emitting phosphor is particularly important among the three phosphors because light-emitting characteristics of the blue light emitting phosphor have a great influence on a flux of light and color rendering property. As such blue light emitting phosphor, Eu-activated barium-magnesium-aluminum oxide phosphor ($BaMg_2Al_{16}O_{27}$:Eu) has been widely utilized because of its strong luminous intensity and excellent blue color rendering property.

Although Eu-activated barium-magnesium-aluminum oxide phosphor is widely utilized as a blue light emitting phosphor as described above, it is hard to say that the luminous efficiency of the blue light emitting phosphor is sufficient. When Eu-activated barium-magnesium-aluminum oxide phosphor is utilized as a phosphor of a fluorescent lamp, the luminous intensity of blue light reduces significantly after long lighting hours compared with those of red and green light, resulting in deviation of color which is one of the causes of worsening color rendering property. On the other hand, from the viewpoint of issues concerning energy consumption, disposal of waste materials and environmental pollution, a fluorescent lamp having a longer life with bright color and without deviation of color has been demanded not only from the industries but also from general consumers.

Recently various improvement of characteristics of Eu-activated barium-magnesium-aluminum oxide phosphor has been made, however, sufficient performance has not been obtained yet.

SUMMARY OF THE INVENTION

An object of the present invention is to provide a blue light emitting phosphor whose luminous intensity is stronger and luminous intensity reduction after long lighting hours is less as compared with Eu-activated barium-magnesium-aluminum oxide phosphor, when it is utilized as a phosphor of a fluorescent lamp.

Another object of this invention is to provide a fluorescent lamp utilizing a blue light emitting phosphor whose reduction in luminous intensity after long lighting hours is small.

The present invention provides a phosphor represented by the formula $(1-x)CaO.xEu(O).yMgO.nSiO_2$, wherein x, y and n represent number of moles, respectively.

The present invention also provides a fluorescent lamp comprising a phosphor of the present invention.

The present invention further provides a fluorescent lamp of three-wavelength-region emitting type comprising a mixture of a red light emitting phosphor, a green light emitting phosphor and a blue light emitting phosphor, wherein said blue light emitting phosphor is the phosphor of the present invention.

DETAILED DESCRIPTION OF THE PREFERRED EMBODIMENTS

Figure 2:
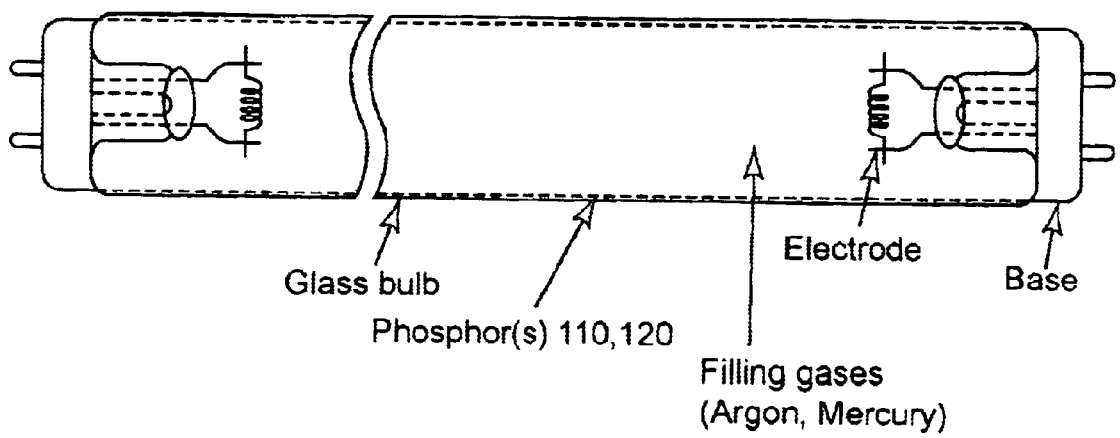
FIG. 2 illustrates a representative structure of a fluorescent lame in accordance with an illustration on page 361 of "Phosphor Handbook" S. Shionova et al., editors: CRC Press, © 1999 and including a phosphor in accordance with the invention.

The present invention provides a phosphor 110 represented by the formula $(1-x)CaO.xEu(O).yMgO.nSiO_2$, wherein x, y and n represent number of moles, respectively, particularly for use in a fluorescent lamp of any type, as generally represented in FIG. 2. It is to be understood that while the lamp structure illustrated in FIG. 2 is well-known and is generalized, as illustrated, the lamp is depicted as including a phosohor in accordance with the invention and is thus expressly not admitted to be prior art as to the present invention.

In embodiments, the phosphor as described above is particularly effective and thus preferable when x, y and n satisfy $0.001 \leq x \leq 0.5$, $0.1 \leq y \leq 2$ and $1 \leq n \leq 3$, respectively. More preferably, x, y and n satisfy $x=0.02$, $y=1.0$ and $2.0 \leq n \leq 2.4$, respectively.

A fluorescent lamp of the present invention can comprise a mercury luminescent line as an excitation source.

A fluorescent lamp of the present invention can have a cold cathode type structure or a hot cathode type structure.

Hereinafter, embodiments for carrying out the present invention will be explained with reference to a drawing.

EXAMPLE 1

Firstly, in order to prepare the blue light emitting phosphor of Example 1, 69.7 g of $CaCO_3$, 60 g of $MgCO_3$, 94 g of $SiO_2$, 2.9 g of $EuF_3$ were weighed as raw materials, and charged into ethanol and stirred for 24 hours. Then, the precipitates were collected, put into a crucible and calcined at 850° C. in the atmosphere of hydrogen. After the calcined product was pulverized and sieved, the sieved product was further calcined at 1300° C. in the atmosphere of hydrogen. After the calcination, the product was pulverized again, dried and sieved to obtain the blue light emitting phosphor of the Example 1 represented by $0.98CaO.0.02Eu(O).MgO.2.2SiO_2$.

EXAMPLE 2 AND 3

Furthermore, the following blue light emitting phosphors were prepared according to the same method as that in the Example 1 by changing weight ratio of the four kinds of the raw materials ($CaCO_3$, $MgCO_3$, $SiO_2$, $EuF_3$):

a blue light emitting phosphor of Example 2 represented by $0.98CaO.0.02Eu(O).MgO.2.0SiO_2$;

a blue light emitting phosphor of Example 3 represented by $0.98CaO.0.02Eu(O).MgO.2.4SiO_2$.

Comparative Example

In addition to the Examples, as a comparative example, an Eu-activated barium-magnesium-aluminum oxide phosphor ($BaMg_2Al_{16}O_{27}$:Eu) was prepared which has been conventionally used as a blue light emitting phosphor.

Figure 1:
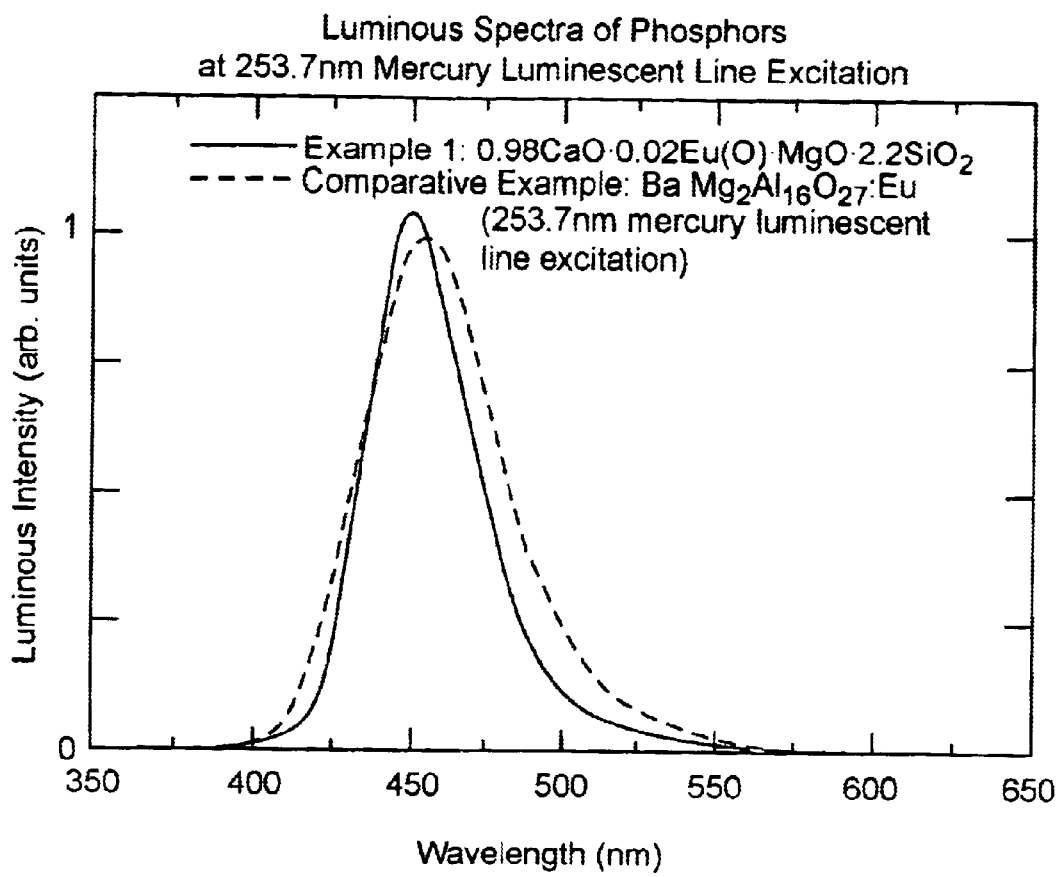
FIG. 1 is a graph which shows comparison of luminous intensity spectra between a blue light emitting phosphor of an example of the present invention and the conventional one.

From the observation result (referring to FIG. 1) of luminous intensity spectra due to mercury luminescent line excitation at wavelength of 254 nm relating to the Example 1 and the Comparative Example, it was confirmed that the luminous intensity of the Example 1 was 105% as a basis of 100% of that of the Comparative Example (the conventional Eu-activated barium-magnesium-aluminum oxide phosphor). The wavelength of emission peak of the conventional Eu-activated barium-magnesium-aluminum oxide phosphor is around 450 nm, while the emission peak of the Example 1 is around 448 nm shorter in wavelength, which confirmed that the color rendering property of blue color was improved.

Then, cold cathode fluorescent lamps (tube diameter φ 2.6, 5 W) were manufactured using blue light emitting phosphors of the Example 1 to 3, respectively, according to a conventionally known methods. For the purpose of comparison, a cold cathode fluorescent lamp was also manufactured using the conventional blue light emitting phosphor (Eu-activated barium-magnesium-aluminum oxide phosphor) of the Comparative Example described above. Initial luminous intensities and those after 2000 hours of lighting were compared among the Examples and the Comparative Example (refer to Table 1). As a result of the comparison, it was confirmed that the initial luminous intensity of the Example 1 was 105%, that of the Example 2 was 103% and that of the Example 3 was 100% as a basis of 100% of the initial luminous intensity of the fluorescent lamp which utilized the conventional blue light emitting phosphor. It was confirmed that the luminous intensity after 2000 hours of lighting of the Comparative Example was 87% which means 13% reduction, while that of the Example 1 was 97%, that of the Example 2 was 94% and that of the Example 3 was 90% which means 8 to 10% reduction in the cases of the three Examples. Therefore, the superiority in sustainability of the luminous intensity of blue light after 2000 hours was also confirmed in the case of phosphors of the Examples.

TABLE 1

Luminous Intensity Of Blue Light Of Fluorescent Lamps

| Composition of phosphors | Lighting hour of lamp | |
| --- | --- | --- |
| | 0 hour | 2000 hour |
| Example 1 $0.98CaO.0.02Eu(O).MgO.2.2SiO_2$ | 105% | 97% |
| Example 2 $0.98CaO.0.02Eu(O).MgO.2.0SiO_2$ | 103% | 94% |
| Example 3 $0.98CaO.0.02Eu(O).MgO.2.4SiO_2$ | 100% | 90% |
| Comparative Example (conventional blue light emitting phosphor) $Ba.Mg_2.Al_{16}O_{27}:Eu$ | 100% | 87% |

Furthermore, a cold cathode fluorescent lamp of three-wavelength-region emitting type (tube diameter φ 2.6, 5 W) was manufactured according to a conventionally known method. Utilizing $(Y,Eu)_2O_3$ as a red light emitting phosphor, $(La,Ce,Tb)PO_4$ as a green light emitting phosphor, and the phosphor of the Example 1 as a blue light emitting phosphor, a correlated color temperature of 7000 K was obtained by mixing these three components so that the composition of the blue light emitting phosphor was 25% in the phosphor mixture 120. For the purpose of comparison, a fluorescent lamp of three-wavelength-region emitting type was also manufactured according to the same method as above utilizing the conventional blue light emitting phosphor (Eu-activated barium-magnesium-aluminum oxide phosphor). Initial luminous intensities were compared among the fluorescent lamps utilizing the phosphors of the Example 1 and the Comparative Example. As a result, it was confirmed that the initial luminous intensity of the fluorescent lamp relating to the Example 1 was 103% as a basis of 100% of the fluorescent lamp utilizing the conventional blue light emitting phosphor. Therefore, the luminous intensity of the fluorescent lamp of three-wavelength-region emitting type in the case of the Example 1 was confirmed to be stronger than that in the case of the Comparative Example.

The blue light emitting phosphors relating to the Example 1 to 3 described so far are those which are represented by the formula $(1-x)CaO.xEu(O).yMgO.nSiO_2$, wherein x, y and n represent number of moles, respectively. From the results of the many experiments conducted by the inventors of this invention, when the number of moles x, y and n described above satisfy the ranges of $0.001 \leq x \leq 0.5$, $0.1 \leq y \leq 2$ and $1 \leq n \leq 3$, respectively, the same effects as in the case of the Examples were confirmed to be obtained.

The application to the cold cathode fluorescent lamps of the blue light emitting phosphors relating to this invention is described in the above examples, however, this invention is not necessarily limited to these examples of the cold cathode fluorescent lamps. As for fluorescent lamps, in addition to the cold cathode fluorescent lamps, there are also hot cathode fluorescent lamps and outside-electrode type lamps with discharge in rare gas (fluorescent lamps having structures providing main discharge electrodes outside of glass bulbs and emitting light by dielectric barrier discharge by charging high-frequency voltage between the main electrodes). The blue light emitting phosphors of this invention have the same effects as in the Examples on fluorescent lamps of any structures wherein films of phosphors are formed on inner surfaces of glass bulbs.

As explained above, according to this invention, a blue light emitting phosphor, which has stronger luminous intensity and, moreover, a superior sustainability in the luminous intensity after a long lighting hours when used in a lamp, compared with the conventional blue light emitting phosphors comprising Eu-activated barium-magnesium-aluminum oxide phosphors, can be obtained and a fluorescent lamp utilizing the phosphor can be provided.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A phosphor represented by the formula $(1-x)CaO.xEu(O).yMgO.nSiO_2$, wherein x, y and n represent number of moles, respectively.

2. A phosphor as claimed in claim 1, wherein the number of moles x, y and n satisfy $0.001 \leq x \leq 0.5$, $0.1 \leq y \leq 2$ and $1 \leq n \leq 3$, respectively.

3. A phosphor as claimed in claim 1, wherein the number of moles x, y and n satisfy $x=0.02$, $y=1.0$ and $2.0 \leq n \leq 2.4$, respectively.

4. A phosphor as claimed in claim 1, wherein the number of moles x, y and n satisfy $x=0.02$, $y=1.0$ and $n=2.2$, respectively.

5. A phosphor as claimed in claim 1, wherein the number of moles x, y and n satisfy $x=0.02$, $y=1.0$ and $n=2.0$, respectively.

6. A phosphor as claimed in claim 1, wherein the number of moles x, y and n satisfy x=0.02, y=1.0 and n=2.4, respectively.

7. A fluorescent lamp comprising any one of the phosphors as claimed in claim 1.

8. A fluorescent lamp of three-wavelength-region emitting type comprising a mixture of red light emitting phosphor, a green light emitting phosphor and a blue light emitting phosphor, wherein said blue light emitting phosphor is any one of the phosphors as claimed in claim 1.

9. A fluorescent lamp as claimed in claim 7 comprising a mercury luminescent line as an excitation source.

10. A fluorescent lamp as claimed in claim 7 having a cold cathode type structure.

11. A fluorescent lamp as claimed in claim 7 having a hot cathode type structure.

12. A fluorescent lamp as claimed in claim 8 comprising a mercury luminescent line as an excitation source.

13. A fluorescent lamp as claimed in claim 8 having a cold cathode type structure.

14. A fluorescent lamp as claimed in claim 8 having a hot cathode type structure.

* * * * *